March 14, 1967  L. FEDERICI  3,309,071
DEVICE FOR AUTOMATIC PREPARATION AND ACCOMMODATION OF
SOLDERED SETS OF PLATES FOR STORAGE BATTERIES
Filed May 4, 1964  6 Sheets-Sheet 1
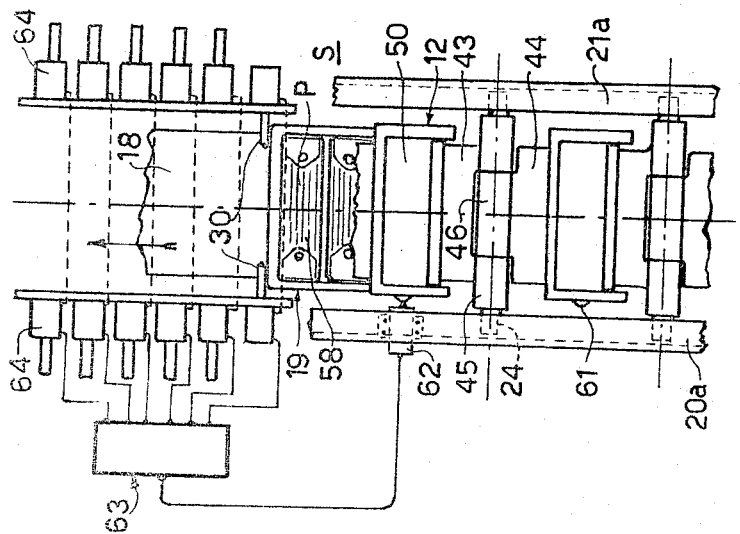
INVENTOR.
Leonida Federici
BY
Stevens, Davis, Miller & Mosher
ATTORNEYS

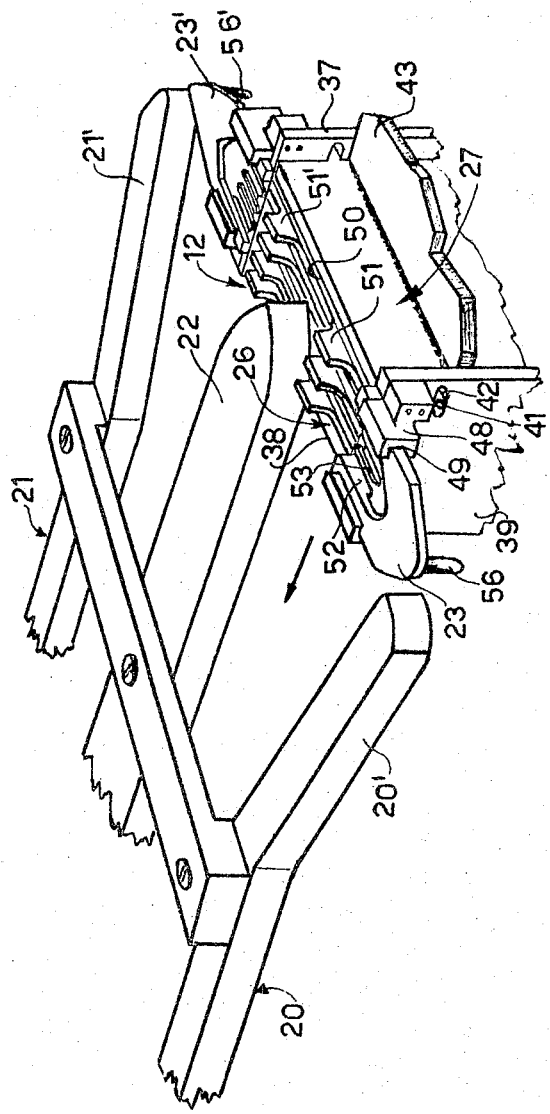

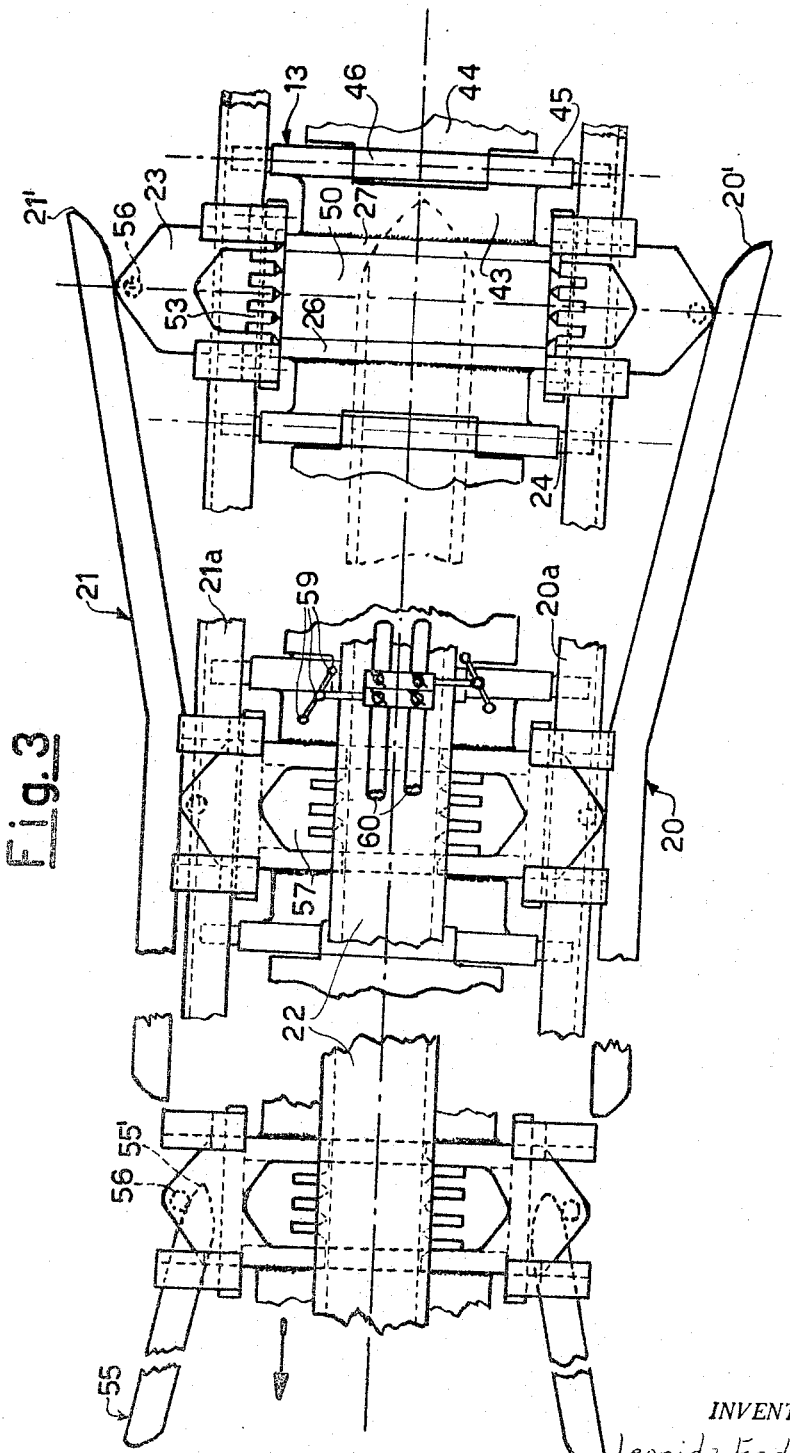

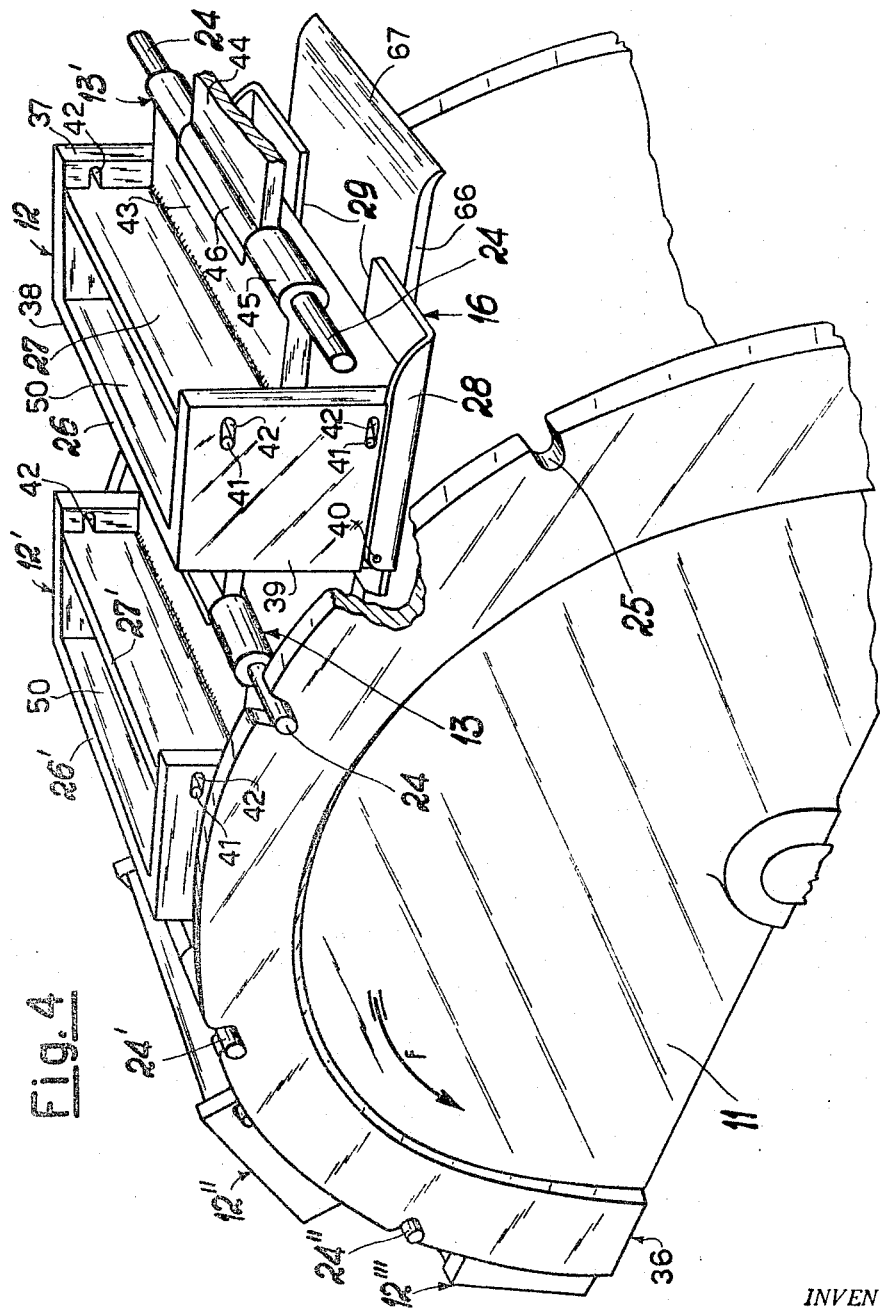

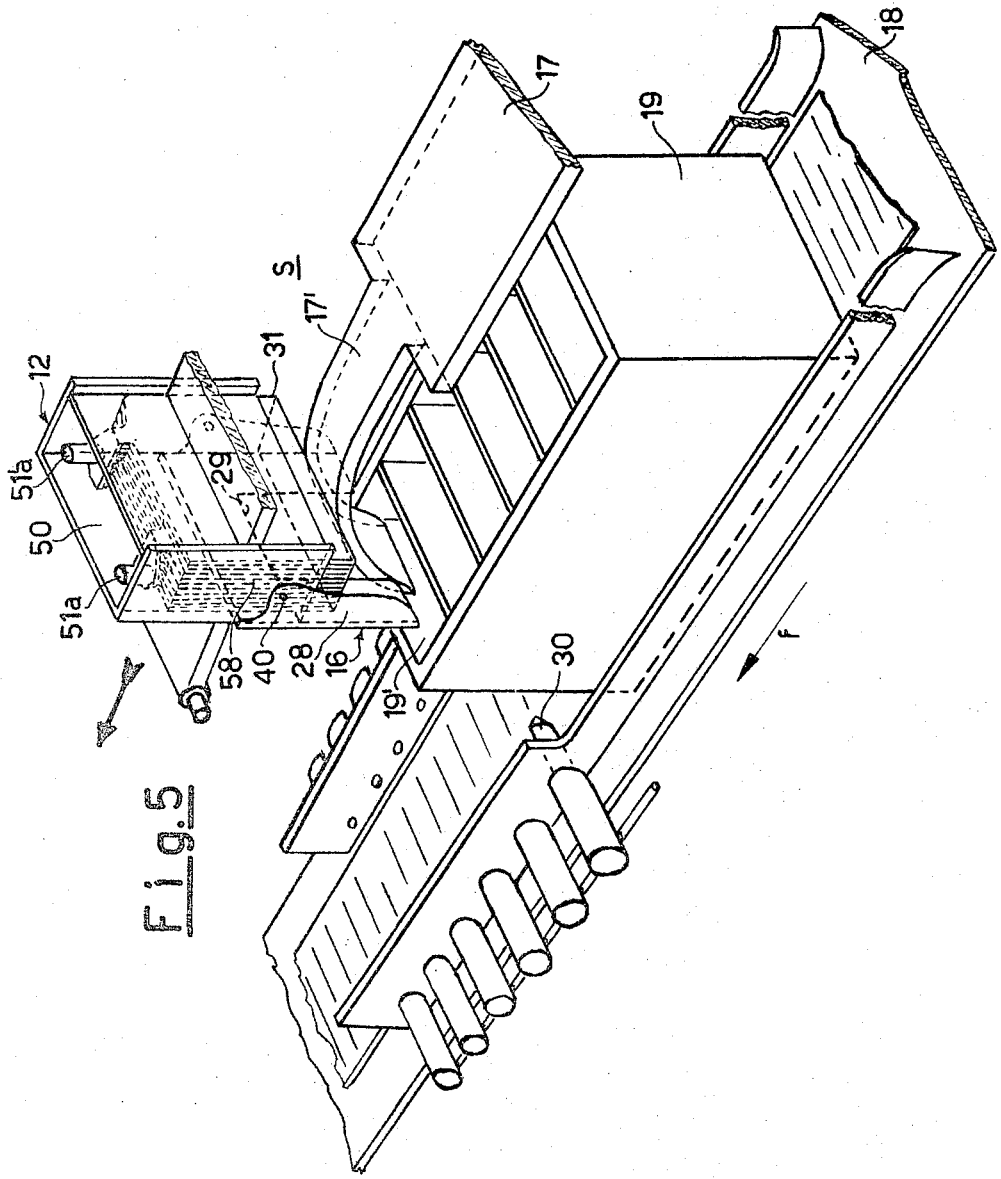

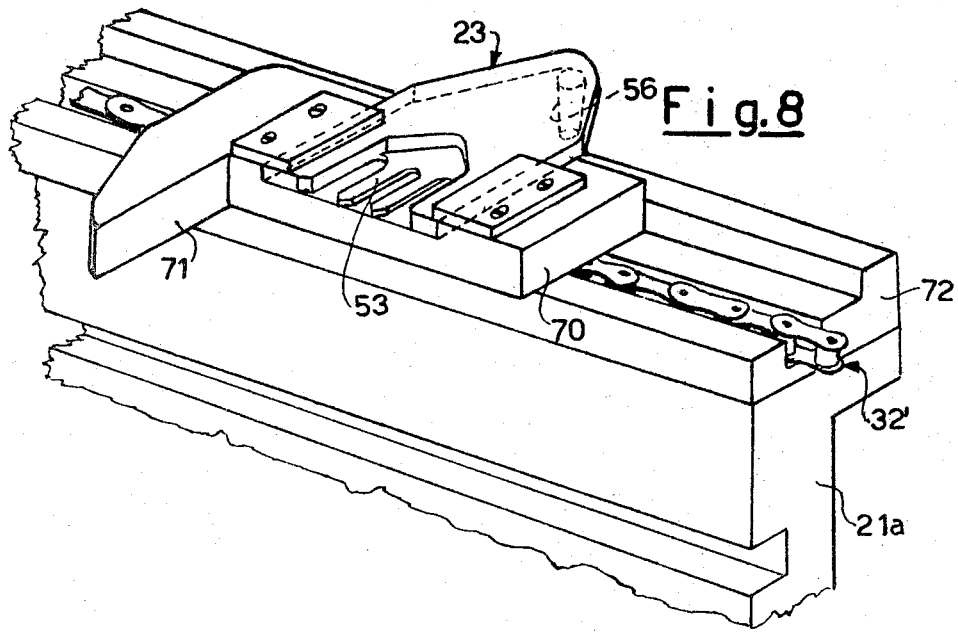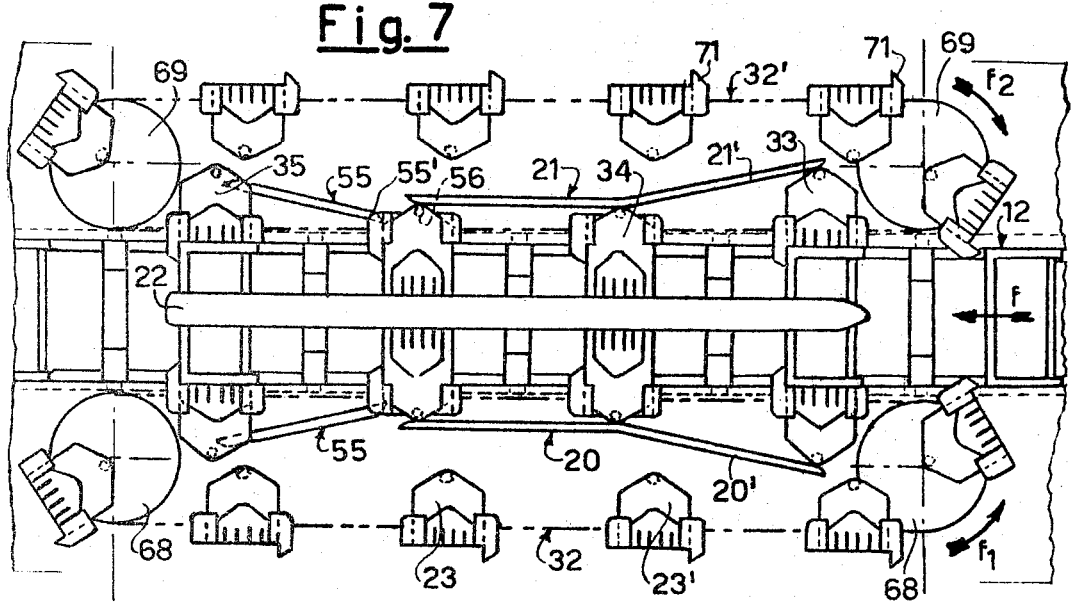

United States Patent Office 3,309,071
Patented Mar. 14, 1967

3,309,071
DEVICE FOR AUTOMATIC PREPARATION AND ACCOMMODATION OF SOLDERED SETS OF PLATES FOR STORAGE BATTERIES
Leonida Federici, Via Monte S. Michele 61,
Sesto San Giovanni, Milan, Italy
Filed May 4, 1964, Ser. No. 364,639
Claims priority, application Italy, May 8, 1963,
34,792/63, Patent 695,355
4 Claims. (Cl. 263—8)

It is an object of the present invention to provide a device for the automatic preparation and accommodation of sets of plates for storage batteries.

As is known, in the manufacture of block batteries by methods by hand as used heretofore, the labor needed for the various operations such as for instance the compression of the sets in the soldering stage and the introduction of the sets so prepared into the cells or compartments of the container has considerable bearance upon the ultimate cost of the batteries.

It is an important object of the invention to perform said operations automatically, thereby reducing time and labor. Other objects and advantages of the invention will appear from the description that follows.

The device according to the invention is essentially characterized in that it comprises a succession of boxes each of which comprises three vertical walls, and is closed laterally by a fourth vertical wall connected to said box with possibility of transversal displacement and hingedly connected to the adjacent box, said boxes forming a continuous chain traveling on two drums with horizontal axes of which one is driving and tensions the lower piece of the chain, means for braking said chain at a point of its upper section, means for closing the bottom side of the boxes between the driving drum and said braking point and heating means placed above said chain between the drive drum and said breaking point.

The device according to the invention will now be more fully described in an embodiment thereof which is given merely by way of example without limitation, with reference to the accompanying drawings, in which:

FIG. 1 represents a diagrammatical view, in elevation, of a device according to the invention;

FIG. 2 shows a partial perspective view in enlarged scale of linear cams for controlling comb-shaped members for the soldering of packs of plates;

FIG. 3 shows the cams according to FIGURE 2, in top plan view;

FIG. 4 represents the perspective view in enlarged scale of the composite conveyor for the plates of the batteries, in register with the driven drum;

FIG. 5 illustrates a perspective view of the station of introduction of the sets of plates into the cells of the containers;

FIG. 6 diagrammatically represents the plan view from above of the subject-matter of FIG. 5, comprising an auxiliary device adapted to stop temporarily the containers during the loading of each compartment or cell with a set of plates;

FIG. 7 shows a diagrammatical plan view of a variant in which the combs of FIG. 2 are carried by pairs of idle chains at the two sides of the composite conveyor and are engageable by each box of said conveyor;

FIG. 8 represents in enlarged scale the detail of a comb according to FIGURE 7, and of fixed guides retaining it against the box-shaped elements of the composite conveyor, during the soldering step.

With reference to the above listed figures (especially FIG. 4), the device according to the present invention comprises a composite continuous conveyor T, formed by two rotary drums 10 and 11, of which the drum 10 is the driving drum both being provided with flanges 36 carrying notches 25 adapted to receive the ends of pins 24, 24′, 24″, . . . , projecting from the composite conveyor that is formed by boxes 12, 12′, 12″, . . . , each including two component elements 26 and 27 said boxes being connected by articulation by said pins 24.

Each of the elements 26, 26′, 26″, . . . , consists of continuous walls 37, 38, 39 at right angles to one another, the wall 38 being perpendicular to the motion of the conveyor, and the chamber 50 formed thereby being open on the near side, with respect to the direction of the movement of the conveyor. Bottom walls 16, 16′, . . . , with borders 28, for supporting the plates P are hinged at 40 to the lateral walls 37 and 39.

The elements 27, 27′, 27″, . . . , are formed by movable walls that close the open side of the elements 26. Each element 27 in fact can undergo a limited displacement with respect to the associated element 26, being mounted with its own pins 41 within elongated horizontal slits 42 provided in the walls 37 and 39 of the element 26.

Each one of the elements 26 and 27 has projecting parts 43 and 44, carrying respectively bushes 45, 46 forming together with the pins 24, the hinges 13, 13′, 13″, . . . , of the conveyor T.

In the bottom wall 16 there is provided a recess 29 for the curved end 17′ of the strip 17 supporting the bottoms 16, as will be more fully explained hereinafter.

The walls 38 and 27 of each box 12, 12′, . . . , are spaced—during the movement of the conveyor T according to the arrow f, the conveyor being under traction—from one another at maximal spacing.

At 14, at the beginning of the upper branch of the conveyor, the plates are introduced into the box 12.

After the point 14 there is a zone 15 in which takes place the soldering of the plates and which will be dealt with later on, and after the zone 15, there is a braking means A arranged laterally with respect to the conveyor T, and acting upon the pins 24 in such a way as to oppose the movement of the conveyor along the arrow F.

Owing to the braking, the walls 27 (before A and as far as B) come nearer to the walls 38 of every box 12, thus pressing together the plates contained in the chamber 50, which now becomes narrower in each box 12. Each of the walls 37 and 39 is provided at its outside top with a fixed bracket 48, 48′ (FIG. 2) with a groove 49 in which a piece 23, 23′ is slidably supported. The piece 51 rigidly supports a comb piece 53, 53′ having pointed teeth.

In correspondence to the soldering zone 15 there are provided cams 20 and 21, fixed to the guides 20a and 21a, between which there is a central fixed rectilinear strip 22. The upstream ends 20′, 21′ of the guides 20, 21 are diverging, so as to act upon the parts 23 to take the comb members 53 against the central strip 22, thereby blocking the terminal lugs 51, 51′ projecting from the plates placed in each box 12.

FIGURES 2 and 3 illustrate these steps above described. At the end of the soldering zone there act further guides or linear cams 55 inclined towards the conveyor, which by their end 55′ engage with pins 56 rigid with 23, returning the combs to their initial position. When the combs abut against the strip 22, which occurs in the zone 15, the piece 23 with the strip 22 confine spaces 57, in which lead of said lugs is caused to melt together with the lead of the straps of terminal posts 51a, 51′a previously placed in said spaces—solidification of the molten lead connects the plates thereby forming the sets of elements 58 in a single piece to be introduced into each compartment 19′ of each container 19 (FIG. 5).

Melting of the lead in 15 is effected by means of a series of gas burners 59 fed by respective conduits 60, which burners are placed at 15 above the boxes 12, 12′, . . . .

After the brake A and for the whole path A–E–D–C–B the boxes 12, ..., are under traction, and therefore, each of the chambers 50 has the maximal width permitted by the connections 41–42. Consequently the elements 58 are no longer pressed between the walls 38 and 27 and can be removed for introduction into the compartments 19′ of the containers 19. The containers 19 are supported by an auxiliary conveyor 18 arranged inside the ring formed by the conveyor T, under the portion A–E thereof after the brake. The conveyor 18 moves in the same direction as T.

In order to permit the descent of the members 58 into the compartments 19′, the terminal part 17′ of the strip 17 is of reduced width and is bent downwards (see FIGURES 1 and 5). The provision of said restricted portion 17′ permits the bottom walls 16 to tilt down rotating on the pins 40 to a vertical position, so that the elements 58 can slide by gravity on 17′ or be optionally pushed down by any mechanical means, not represented, to gradually descend into the respective members 19′, in register with the loading station S.

Stopping dowels 30 are provided for stopping each container 19 in as many positions as are its compartments 19′, whereby every unit 58 can slide down into a respective compartment 19′, while the container is at rest without being hurt or damaged.

The successive stops of every container 19, are obtained by means of dowels 30 (see FIG. 6) controlled for instance by an electromagnetic control device.

The control device comprises projections 61 on a side of the boxes 12; when the boxes arrive in register with the station S, the projections 61 actuate a push-button 62 which controls a contactor 63 that closes in succession a series of relay circuits 64, which in turn cause the dowels 30 one after the other to be brought into the path of the container 19 in the loading stage thereby stopping it momentarily. Of course the relays 64 are in number $n$, equal to that of the cells or compartments 19′, of each container 19. In that way for $n$ compartments there will be $n$ relays, $n$ electromagnetic dowels 30 for stopping $n$ times each container 19. At every stop of the movement of the containers, an element 58 will reach the respective compartment in the container until all of the compartments are filled.

When the containers 19 reach the end of the conveyor 18, they are conveyed in another direction by a conventional deflecting means indicated at 65.

After the station S, in the proximity of the position E, before the drum 11, there is another fixed rigid strip 66 the curved part 67 of which raises the bottoms 16, 16′, ..., again, returning them to the substantially horizontal position, which position they will keep till attaining again the station S through D–C–B–A.

Now with reference in particular to FIGURES 7 and 8, there will be described a constructional modification according to which the members 23 with the combs 53, 53′ are carried by two idling continuous chains 32–32′, each one mounted on pairs of drums 68 and 69, the combs being fixed on said chains at intervals exactly corresponding to the distance between contiguous boxes 12.

Each member 23, 23′, ..., is carried by a base block 70 provided with a tooth 71 through which the member 23 comes to engage with a respective box 12, in the movement of the latter according to $f$, the chains 32, 32′ being moved according to the arrows $f_1$ and $f_2$, by the engagement of the teeth 71 with said boxes.

When the members 23 engage with the boxes 12, the blocks 70 are guided by rectilinear guides 72. Subsequently, the combs 23, engaging with the cam profiles 20, 21, 55, pass successively from the open position 33 to the closed position 34 and then again to the open position 35.

The device according to the invention has been described and illustrated in one embodiment with one variant, but it is understood that further constructional variants can be made and equivalent means can be used instead of those described merely by way of example without limitation, without departing from the scope of this invention.

I claim:
1. A device for preparation of sets of plates for storage batteries comprising an endless conveyor consisting of a plurality of uniform links forming a conveyor chain, each link comprising a box having three fixed vertical walls and being closed laterally by a displaceable fourth vertical wall, each link of said conveyor being hingedly joined together, two of said fixed walls of said box being lateral walls lying parallel to the motion of the conveyor with the third wall interconnecting said lateral walls and lying transverse to the motion of the conveyor, said conveyor further having at least two drums with horizontally disposed axes, at least one of said drums being a driving drum which exerts tension on the lower portion of said conveyor chain, means disposed along the upper path of said chain for exerting a braking force thereon, bottom means on said boxes hingedly pivoted to the leading edge thereof, means for closing said bottom of box between the driving drum and said braking point, means for inserting into said boxes sets of plates for storage batteries, and heating means disposed above said chain between said driving drum and said braking point.

2. A device for the preparation of sets of plates for storage batteries comprising a succession of boxes each of which comprises three vertical walls, and is closed laterally by a displaceable fourth vertical wall connected to said box and lying transverse to the direction of movement of said boxes, each box being hingedly connected to the adjacent box, said boxes forming a continuous chain traveling on two drums having horizontal axes of which one is the driving drum and tensions the lower branch of the chain, means for braking said chain at a point of its upper branch, means for closing the bottom side of the boxes between the driving drum and said braking point, heating means placed above said chain between the driving drum and said braking point, a conveyor for conveying containers of storage batteries to a point below the upper branch of said chain, each said container having a plurality of compartments therein, and means for temporarily stopping the movement of each container on said conveyor as many times as there are compartments in said storage battery containers.

3. A device according to claim 2, characterized in that said means for temporarily stopping the containers comprises a series of electromagnets energized one at a time in succession for actuating respective stop means for stopping the movement of each container in a succession of positions.

4. A device according to claim 3, in which an electric contact actuated by each box controls a switch for energizing said electromagnets.

References Cited by the Examiner
UNITED STATES PATENTS

| | | | |
|---|---|---|---|
| 1,004,992 | 10/1911 | Christ | 198—143 |
| 1,333,371 | 3/1920 | Barnhart | 263—8 |
| 1,921,956 | 8/1933 | Vickers | 263—6 |
| 2,539,318 | 1/1951 | Orsino | 228—58 X |

FREDERICK L. MATTESON, JR., *Primary Examiner.*
D. A. TAMBURRO, *Assistant Examiner.*